(12) United States Patent
Luo

(10) Patent No.: US 10,291,777 B1
(45) Date of Patent: May 14, 2019

(54) USING TEXT FOR HANDLING E911 VOICE CALLS

(71) Applicant: T-Mobile USA, Inc., Bellevue, WA (US)

(72) Inventor: Tong Luo, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/980,037

(22) Filed: May 15, 2018

(51) Int. Cl.
*G06F 15/00* (2006.01)
*H04M 3/51* (2006.01)
*H04M 3/42* (2006.01)
*H04M 3/22* (2006.01)
*G06F 17/27* (2006.01)
*H04M 3/523* (2006.01)

(52) U.S. Cl.
CPC ....... *H04M 3/5116* (2013.01); *G06F 17/2775* (2013.01); *H04M 3/2272* (2013.01); *H04M 3/42059* (2013.01); *H04M 3/42382* (2013.01); *H04M 3/523* (2013.01); *H04M 2203/558* (2013.01); *H04M 2242/04* (2013.01); *H04M 2242/30* (2013.01)

(58) Field of Classification Search
CPC ........... H04W 4/12; H04W 4/02; H04W 4/16; H04W 4/04; H04W 64/00
USPC .... 455/404.2, 410, 412.2, 414.1, 418, 404.1
See application file for complete search history.

(56) References Cited

U.S. PATENT DOCUMENTS

2014/0148117 A1\* 5/2014 Basore .................... H04W 4/90
455/404.1

\* cited by examiner

*Primary Examiner* — Sam Bhattacharya
(74) *Attorney, Agent, or Firm* — Lee & Hayes, P.C.

(57) ABSTRACT

A computing system may automatically send a text message to a caller of an E911 call in addition to existing E911 call handling in response to one or more failures of an E911 system. Sending the text message may be a response to a technical failure associated with normal voice call handling and routing. The text message may also be a response to an emergency services center's failure to answer an E911 call. This failure may be due to technical problems or high call volumes, among other things. The text message can prompt the E911 caller to contact 911 services using a text message reply including information association with the nature of the emergency about which the caller is calling 911. The text message can be placed in a call queue at the emergency services center or routed to a local public safety answering point (PSAP).

19 Claims, 4 Drawing Sheets

USING TEXT FOR HANDLING E911 VOICE CALLS

BACKGROUND

In recent years, telecommunication devices have advanced from offering simple voice calling services within wireless communication networks to providing users with many new features, such as messaging services such as email, text messaging, and instant messaging. Thus, telecommunication devices, referred to herein as user devices or mobile devices, are often used in multiple contexts.

Enhanced 911, or E-911 (herein, "E911"), is a system used in North America to automatically provide dispatchers with the location of callers to 911 services—the universal emergency telephone number in the region. Generally, an incoming 911 call is answered at a local governmental public safety answering point (PSAP) by a specially trained official known as a telecommunicator. Special computer software uses information provided by the telephone company to display to the telecommunicator the physical address or geographic coordinates of the caller. The telecommunicator can then dispatch police, fire, medical, and other services as needed. Herein, a telecommunicator will be called an operator or human operator to distinguish this operator from a computing device.

Sometimes the system may automatically route a call to an entity other than a PSAP such as, for example, if the PSAP fails to respond (e.g., answer) to the call within a particular timeframe. Such a failure may be due to a large amount of traffic (e.g., calls) going to the PSAP or may be due to a technical failure in some portion of the system. An E911 call may be routed to a call center configured to handle a relatively large number of incoming calls. Such a call center may be located relatively far from the caller and the caller's nearest PSAP. Nevertheless, the call center may handle the call and perform functions that are required for an emergency associated with the call. Difficulties arise, however, if the call center also fails to respond to the call within a particular timeframe.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein are techniques and architectures that allow a computing system to automatically send a text message to a caller placing an E911 call in addition to conventional E911 call handling. The text message can prompt the E911 caller to contact 911 services using one or more wireless text messages, which can be routed to a local public safety answering point (PSAP) with information about the location of the caller. In some implementations, sent and received text messages and location information can be saved in a queue for later processing.

Generally, under distress conditions, when a relatively large number of E911 calls congest resources of local PSAPs and/or wireless carriers, a system (e.g., such as at a gateway mobile location center (GMLC)) may automatically forward excess E911 call traffic to an external voice line that can manually record the caller's request and route calls to alternative emergency response resources in the caller's area. Under extreme conditions, e.g. during a large natural disaster, a terrorist attack, or a technical malfunction of the system, local emergency response resources may be unable to handle additional voice calls. Such additional voice calls may be consequently routed to another, often more distant, call center (e.g., a national call center) having a relatively large capacity for receiving calls. Such a call center also may be unable to handle additional voice calls. Upon such failure, the system may generate a text message and send the text message to devices associated with the respective E911 callers. The text message may provide instructions to the caller. The text message may ask the caller, for example, to describe the emergency in a text reply. In some implementations, text messages received from the caller may be time-stamped and analyzed for content and placed in a queue for determining subsequent actions to be performed by the call center.

Figure 1:
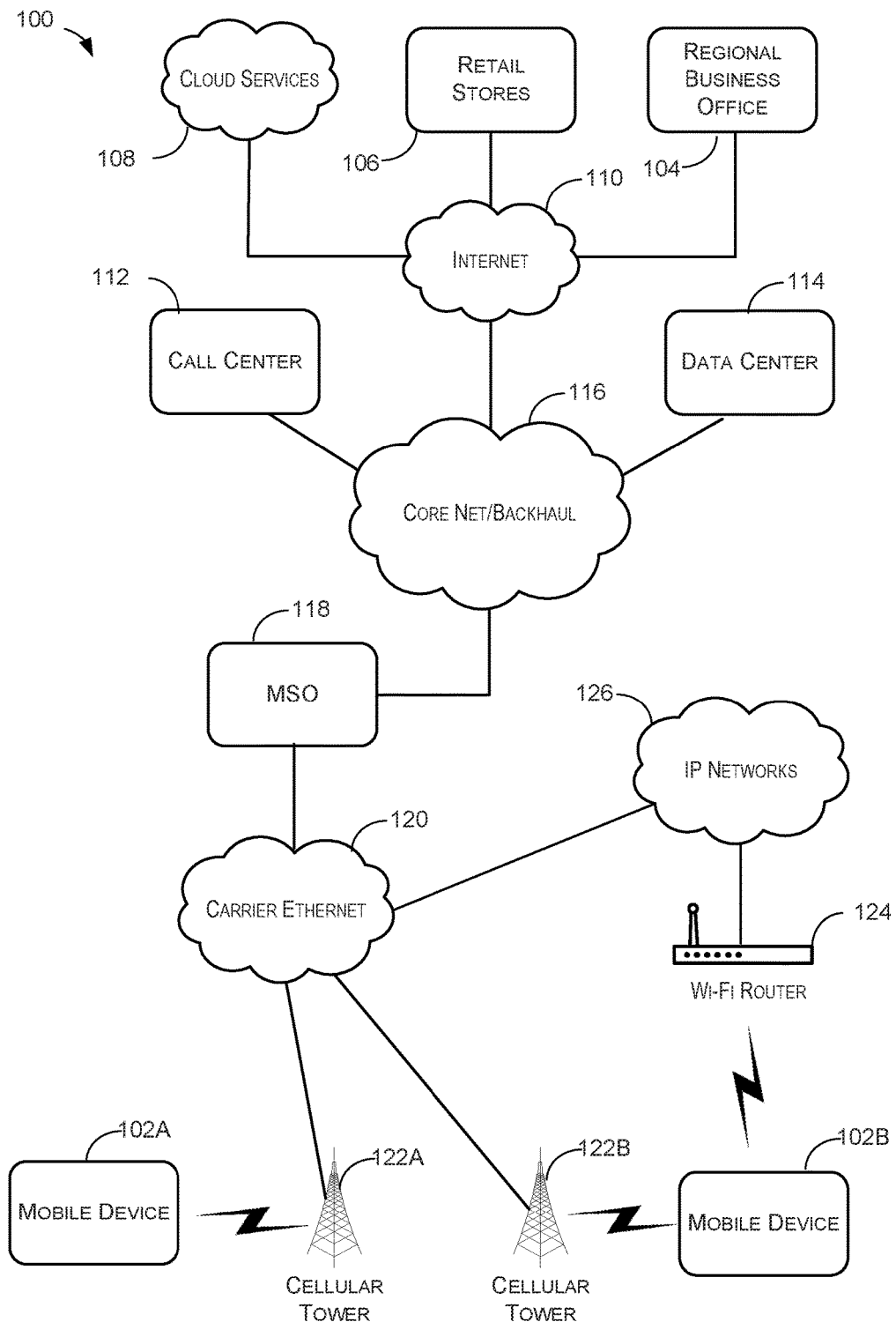
FIG. 1 schematically illustrates a wireless communication network, according to various embodiments.

FIG. 1 schematically illustrates an example of a wireless communication network 100 (also referred to herein as simply the network 100) that may be accessed by the mobile devices 102 (which need not necessarily be mobile and are also referred to herein as client devices). As can be seen, in various configurations, the wireless communication network 100 includes multiple nodes and networks. The multiple nodes and networks may include one or more of, for example, a regional business office 104, one or more retail stores 106, cloud services 108, the Internet 110, a call center 112, a data center 114, a core net/backhaul network 116, a mobile switch office (MSO) 118, and a carrier Ethernet 120. The wireless communication network 100 may include other nodes and/or networks not specifically mentioned, or may include fewer nodes and/or networks than specifically mentioned. In some examples, the network 100 may provide infrastructure for one or more events that occur during an application session.

Access points such as, for example, cellular towers 122, can be utilized to provide access to the wireless communication network 100 for the mobile devices 102. In various configurations, the wireless communication network 100 may represent a regional or subnetwork of an overall larger wireless communication network. Thus, a larger wireless communication network may be made up of multiple networks similar to the wireless communication network 100 and thus the nodes and networks illustrated in FIG. 1 may be replicated within the larger wireless communication network. In particular, in the example situation illustrated in FIG. 1, a first mobile device 102A is in a cell serviced by a first cellular tower 122A and a second mobile device 102B is in a cell serviced by a second cellular tower 122B.

In various configurations, the mobile devices 102 may comprise any devices for communicating over a wireless communication network. Such devices include mobile telephones, cellular telephones, mobile computers, personal digital assistants (PDAs), radio frequency devices, handheld computers, laptop computers, tablet computers, pagers, desktop computers, devices configured as internet of things (IoT) devices, integrated devices combining one or more of the preceding devices, etc. As such, the mobile devices 102 may range widely in terms of capabilities and features. For example, one of the mobile devices 102 may have a numeric keypad, a capability to display only a few lines of text and be configured to interoperate with only GSM networks. However, another of the mobile devices 102 (e.g., a smart phone) may have a touch-sensitive screen, a stylus, an embedded GPS receiver, and a relatively high-resolution display, and be configured to interoperate with multiple types of networks. The mobile devices 102 may also include SIM-less devices (i.e., mobile devices that do not contain a subscriber identity module ("SIM")), roaming mobile devices (i.e., mobile devices operating outside of their home access networks), and/or mobile software applications.

In configurations, the wireless communication network 100 may be configured as one of many types of networks and thus may communicate with the mobile devices 102 using one or more standards, including but not limited to GSM, time division multiple access (TDMA), universal mobile telecommunications system (UMTS), evolution-data optimized (EVDO), long term evolution (LTE), generic access network (GAN), unlicensed mobile access (UMA), code division multiple access (CDMA) protocols (including IS-95, IS-2000, and IS-856 protocols), advanced LTE or LTE+, orthogonal frequency division multiple access (OFDM), general packet radio service (GPRS), enhanced data GSM environment (EDGE), advanced mobile phone system (AMPS), high speed packet access (HSPA), (including high speed downlink packet access (HSDPA) and high speed uplink packet access (HSUPA)), ultra-mobile broadband (UMB), etc. In embodiments, as previously noted, the wireless communication network 100 may be include an IMS and thus, may provide various services such as, for example, voice over long term evolution (VoLTE) service, video over long term evolution (ViLTE) service, rich communication services (RCS) and/or web real time communication (Web RTC).

In addition, the wireless communications network 100 may be configured to communicate with the mobile devices 102 using a Wi-Fi router 124, microcell, or other communications devices. Thus, the mobile devices 102 may connect to the carrier Ethernet 120 via one or more IP networks 126. In this configuration, the mobile devices 102 may connect using Wi-Fi (e.g., 802.11a/c/g/n) or WiMAX protocols (including IEEE 802.16e-2005 and IEEE 802.16m protocols), among other things.

Figure 2:
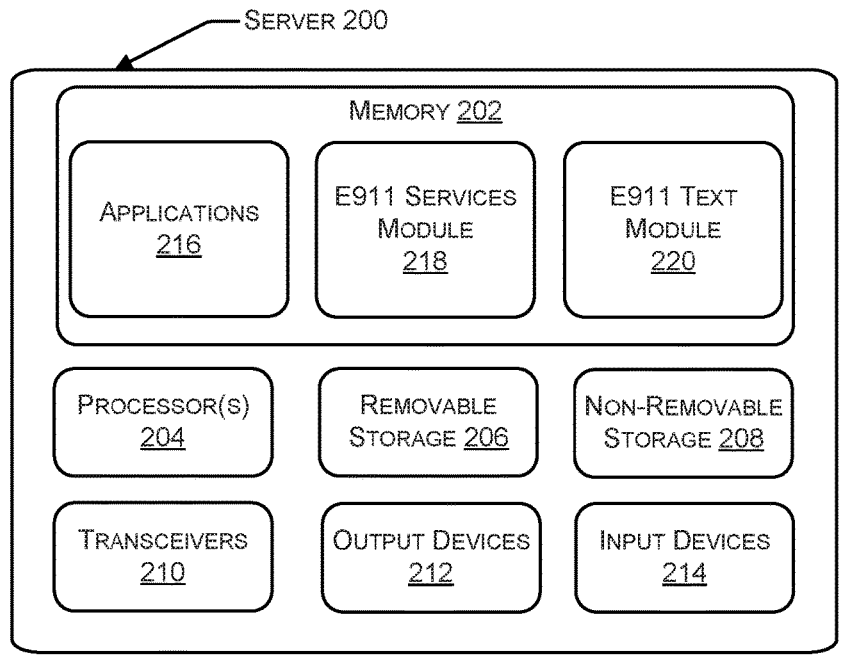
FIG. 2 illustrates a component level view of an example server configured for use in a wireless communication network.

FIG. 2 schematically illustrates a component level view of a server 200. The server 200 may be configured as a node for use within a wireless communication network such as network 100, according to processes described herein. In some embodiments, the server 200 may be a baseband unit (BBU). The server 200 can include a memory 202, one or more processor(s) 204, removable storage 206, non-removable storage 208, one or more transceiver(s) 210, one or more output device(s) 212, and one or more input device(s) 214.

In various implementations, the memory 202 can be volatile (e.g., random access memory, or RAM), non-volatile (e.g., read only memory, or ROM, flash memory, etc.) or some combination of the two. In some implementations, processor(s) 204 is a central processing unit (CPU), a graphics processing unit (GPU), both a CPU and a GPU, or any other sort of processing unit. The memory 202 may also include one or more applications 216 that allow the server 200 to perform various functions. Among the applications 216 or separately in the memory 202 may also include an E911 services module 218 and an E911 text module 220, which are described in detail below. E911 services module 218 and E911 text module 220 may be located in any portion of the wireless communication network 100 such as, for example, in a PSAP or other (large-scale) type of call center, an emergency network, or a network entity on the network 100—e.g., a home subscriber server (HSS).

In some embodiments, the server 200 may be a computing system configured to automatically generate and send a text message to an individual network cellular tower 122 or mobile device 102 associated with an E911 call. Accordingly, applications 216 may include code that enables the server 200 to detect an unsuccessful E911 call to an emergency services center, receive a phone number of the E911 call, generate the text message, and send the text message to the mobile device 102 corresponding to the phone number of the E911 call, among other things.

The server 200 may also include additional data storage devices (removable and/or non-removable) such as, for example, magnetic disks, optical disks, or tape. Such additional storage is represented in FIG. 2 by removable storage 206 and non-removable storage 208.

Non-transitory computer-readable media may include volatile and nonvolatile, removable and non-removable tangible, physical media implemented for storage of information, such as computer readable instructions, data structures, program modules, or other data. The memory 202, removable storage 206 and non-removable storage 208 are all examples of non-transitory computer-readable media. Non-transitory computer-readable media include, but are not limited to, RAM, ROM, electronically erasable programmable ROM (EEPROM), flash memory, or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the server 200. Any such non-transitory computer-readable media may be part of the server 200.

In some implementations, transceiver(s) 210 include any sort of transceivers known in the art. For example, transceiver(s) 210 may include wired communication components, such as an Ethernet port, for communicating with other networked devices. The transceiver(s) 210 may also include wireless modem(s) to may facilitate wireless connectivity with other computing devices. Further, transceiver(s) 210 may include a radio transceiver that performs the function of transmitting and receiving radio frequency communications via an antenna (e.g., a cellular transceiver).

In some implementations, output device(s) 212 can include any sort of output devices known in the art, such as a display (e.g., a liquid crystal display), speakers, a vibrating mechanism, or a tactile feedback mechanism. Output device(s) 212 can also include ports for one or more peripheral devices, such as headphones, peripheral speakers, or a peripheral display.

In various implementations, input device(s) 214 include any sort of input devices known in the art. Input device(s) 214 may include, for example, a camera, a microphone, a keyboard/keypad, or a touch-sensitive display. The keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Figure 3:
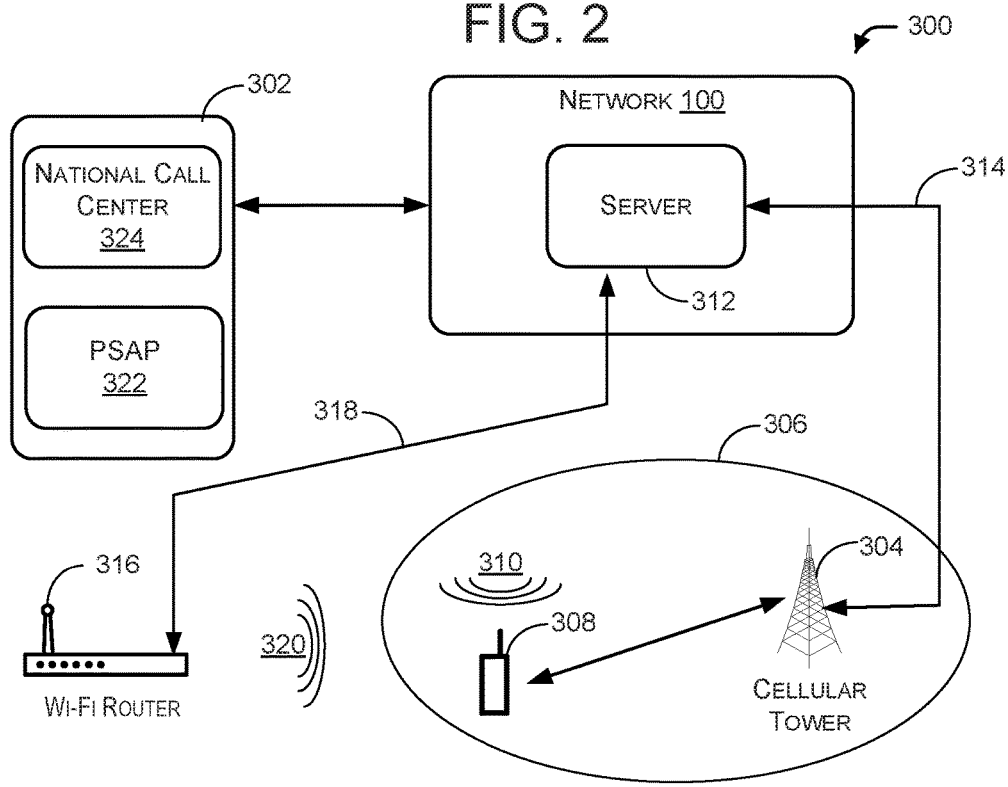
FIG. 3 schematically illustrates a wireless communication network and emergency services system, according to various embodiments.

FIG. 3 schematically illustrates a wireless communication network 300 that includes an emergency services system 302, according to some examples of the present disclosure. In particular, the network 300, which may be a subset of the wireless communication network 100, can include a cellular tower 304 that establishes a network cell 306. A wireless device 308 is located within network cell 306. The cellular tower 304 and wireless device 308 can be wirelessly connected for two-way communication. The wireless device 308 may be configured to receive satellite-based position data 310, such as global positioning system (GPS) data, or other information that enables a location of the wireless device 308 to be determined by the network 300. In some embodiments, location information need not be received from a source external to wireless device 308 but instead may be stored in a memory of the wireless device. The network 300 includes a server 312, which may be similar to, or the same as, the server 200, that receives and transmits signals via wired or wireless path 314. The server 312 may, for example, be located in the core net/backhaul network 116 or MSO 118 of network 100.

The network 300 can also include a Wi-Fi router 316, or other type of wired or wireless router, that establishes an IP connection 318 between the wireless device 308 and the server 312. The Wi-Fi router 316 and wireless device 308 can be wirelessly connected for two-way communication. The wireless device 308 may be configured to receive Wi-Fi-based position data 320, such as Wi-Fi positioning system (WPS), or other information that enables a location of the wireless device 308 to be determined by the network 300. The server 312 can receive and transmit signals via the (wired or wireless) IP connection 318.

Any number of wireless devices 308 may communicate with the cellular tower 304 at any one time. Thus, though FIG. 3 merely illustrates one wireless device 308, multiple wireless devices may communicate with cellular tower 304 at the same time or at different times. Such communication is herein referred to as voice and data traffic and may include phone calls and conversations (e.g., voice-based), video conferencing, text messaging, Internet browsing, data uploads and downloads (e.g., file sharing and streaming), etc.

Emergency services system 302 may include one or more PSAPs 322 and a national call center 324. The national call center 324 may be in more than one location and need not be a single entity. Generally, the national call center 324 is an entity that receives E911 voice calls, which may be redirected from a PSAP 322 that is too busy to handle the call. The word "national" is used merely to imply that the national call center 324 is configured to cover an area greater than an individual PSAP 322, which is generally configured to handle only a relatively small geographic area, but could also cover, for example, a county, city, or region.

Automatic processes (e.g., no human operator is directly involved) involving emergency services as described herein may be performed, fully or in part, by the server 312, or another portion of network 300, and/or emergency services system 302. Such processes may include detecting an unsuccessful E911 call to an emergency services center, such as national call center 324, receiving a phone number for the E911 call, generating a text message, and sending the text message to the wireless device 308 corresponding to the phone number of the E911 call. Such an E911 call may be on a voice line, which may be configured to carry voice-based data. In some implementations, the E911 call may be considered to be unsuccessful based, at least in part, on a failure of the E911 call to reach a human operator of the PSAP 322 and/or the national call center 324 (i.e., the call may "rollover" to the national call center 324 if the PSAP 322 fails to answer within a predetermined timeframe).

A further process performed by the network 300 and/or the emergency services system 302 (individually or combined are hereinafter called "network 300, 302") may include receiving a text message reply from the wireless device 308 in response to the sending of the text message to the wireless device 308. The caller associated with the wireless device 308 can receive the text message from network 300, 302 and may subsequently respond by sending a text message ("text message reply") to network 300, 302.

A further process performed by network 300, 302 may include storing the text message reply and metadata associated with the E911 call in a queue, which may be stored in memory 202. Such metadata may include the time of the call (a timestamp), the identity of the caller, the phone number, location information for the wireless device 308 associated with the E911 call, type of device, the cause of the failure to reach an intended destination (e.g., an operator at the PSAP 322 or national call center 324), etc. Such a queue may be accessible to a human operator at the national call center 324. The operator may be able to retrieve information from the queue for purposes of manually responding to in-queue E911 calls, which have subsequently been "transitioned" to E911 texts by processes mentioned above. The message queue can also be accessed by the PSAP 322 that is local to the originating call. Thus, E911 texts can be routed to the local PSAP 322—based on device location—to enable the PSAP 322 to provide immediate help to callers.

To describe an example situation in a summary of events: an E911 voice call failed to reach a human operator at the PSAP 322, rolled over to the national call center 324, and failed to reach a human operator at the national call center 324. This failure prompted the network 300, 302 to send a text message to the wireless device 308 associated with the E911 call. The caller of the wireless device 308 then receives the text message and replies to the text message. The text message reply and associated data are then stored in a queue and a human operator subsequently retrieves at least a portion of the text message and the associated data and responds manually to the emergency associated with the original E911 voice call. This may include calling the wireless device 308 back, dispatching emergency services based on the contents of the text message reply, or rerouting the call to an appropriate PSAP 322, among other things.

Figure 4:
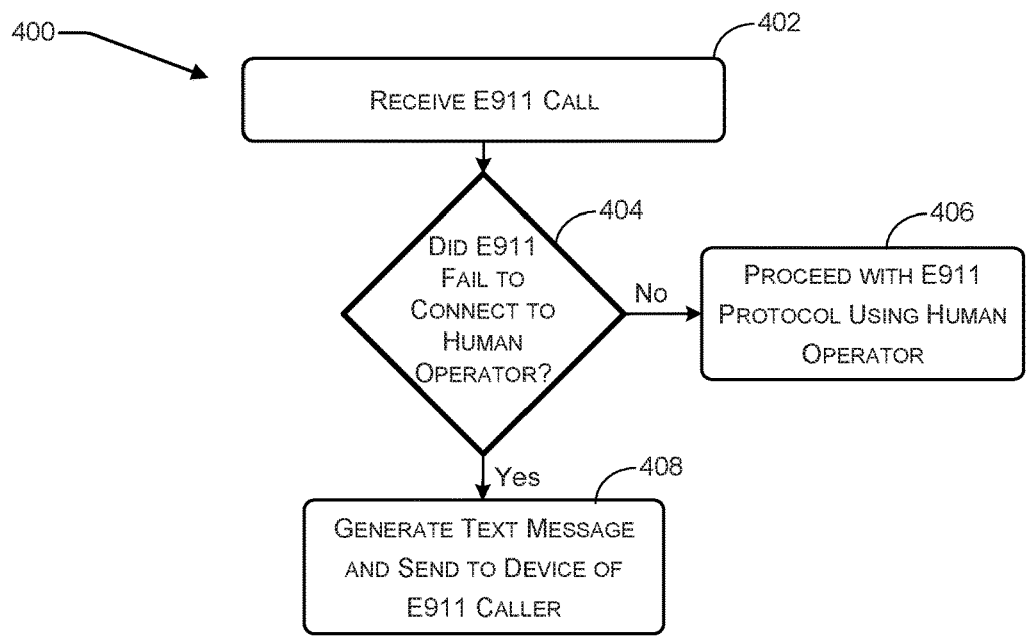
FIG. 4 is a block diagram of a process of handling an E911 call, according to some embodiments.

FIG. 4 is a block diagram of a process 400 for handling an E911 call, according to some embodiments. The process 400 may be performed by the server 312, illustrated in FIG. 3, or, in other examples, may be performed by a combination of E911 services module 218 and E911 text module 220, illustrated in FIG. 2. In some examples, the process 400 may be performed by one or more computing systems located at emergency services system 302. Though the following example description of the process 400 describes server 312 as performing at least a portion of the process, other configurations are possible.

At 402, the server 312 may receive an E911 voice call. The server 312 may monitor the status of the call during the life of the call. The status of the call may be monitored, for example, from the time it is initiated by a device associated with the caller (e.g., wireless device 308), while the call is in a voice line queue to be answered, until the time the call is terminated, etc. Thus, the server 312 may be configured to make a determination, as in diamond 404, as to whether or not the E911 voice call failed to connect to a human operator, for example, which may be located at the emergency services system 302 (i.e., either the national call center 324 or the PSAP 322). If not, and the call was successful, then the process 400 proceeds to 406 where a human operator may proceed in accordance with the protocols for an E911 service. The operator may talk to the caller and determine the type of emergency, for example, the location of emergency, notify emergency responders that are appropriate for the type and location of the emergency, etc.

If the server 312 determines that the call was not successful, on the other hand, then at 408, the server 312 can generate and send a text message to the wireless device 308 associated with the caller without human intervention. Such a failure of the voice call to connect to an operator may be due to, for example, the number of voice calls being received (i.e., the volume is beyond the system's capacity). This may be due to a large-scale natural or manmade disaster. Other reasons include technical malfunctions or the overall response time of the human operators to each call "stacking up" (e.g., none of a number of operators can answer a subsequent call because each operator is busy), just to name a few examples.

The text message generated and sent by the server 312 may include any number of things, such as a notification to the E911 caller that "all voice lines are busy but your emergency call has been received," or "please describe your emergency in a text message by responding to this text message," etc. The server 312 may subsequently receive a text message reply from the caller. The text message reply may include a description of the emergency, location information, a timestamp, and other information provided by the caller or the wireless device 308. In some examples, the server 312 can apply a word recognition process to the text message reply to automatically determine the nature of the emergency, location, or any other information that may be useful to the human operator at the time the human operator is able to respond to the E911 call. The word recognition process may result in an analysis of the text for key words that are generally pertinent to an emergency, such as, for example, "fire," "car," "accident," "injury," "five people," "gunshot," "ambulance," etc. The presence of such words, which may be stored in a database for retrieval by the operator, may allow the operator to be better prepared when calling the E911 caller back. In some implementations, such analysis of the text for key words may allow for an automatic response to the E911 call by the system without engaging a human operator.

Figure 5:
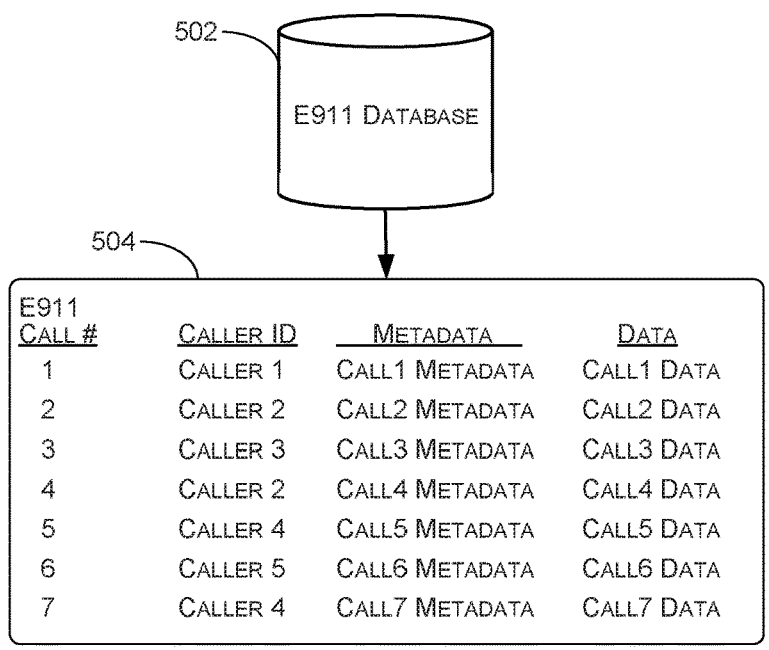
FIG. 5 is a schematic diagram of a database or queue for a sequence of E911 calls, according to some embodiments.

FIG. 5 is a schematic diagram illustrating an E911 database 502 that includes a call queue 504 for a sequence of E911 calls, according to some embodiments. For example, the E911 database 502 may comprise memory similar to or the same as the memory 202 (including removable storage 206 and/or non-removable storage 208), illustrated in FIG. 2. The E911 database 502 may comprise the call queue 504, which may include a data table of calls that initially failed to reach a human operator and information regarding the text message replies associated with the E911 calls, in the order received (e.g., first in, first out, or FIFO). Information included in the call queue for each E911 call can include a call number, caller ID, metadata, and other data. The call number may be based, at least in part, on the time the voice call was received relative to other received voice calls, generally on a FIFO basis. Of course, in some examples, based on the quality of data provided by the aforementioned text recognition, the calls may be ranked in order of severity.

In other words, "gunshot" may be given priority over "car accident," for example. In other examples, a call may be prioritized based on whether the emergency being reported has already been reported by another E911 caller. For example, if "car accident at Pt and Main" has already been reported, repeat reports of that particular emergency may be given lower priority as emergency responders are already aware of that emergency.

The caller ID may include the phone number of the wireless device 308. The metadata may include a reason why the voice call failed to reach a human operator, whether an initial text message has been sent to the caller by the system, whether the caller responded to the text message with a text message reply, and the status of the voice call, just to name a few examples. The data may include name, physical address, type of device used to make the voice call, word recognition analysis of the text message reply, for example, and other information about the call or wireless device 308.

As described above, one or more human operators can then retrieve information about the E911 calls from the call queue 504 and subsequently process the calls. Actions performed by the operator may be asynchronous with the caller in the sense that most, if not all, information about the emergency has already been presented (and stored) to the system via the text message replies from the callers. Thus, the operator may be able to perform steps appropriate for the emergency (e.g., dispatch emergency services or police) offline from the caller. Of course, in some examples, the operator can also call the E911 caller to engage in a conversation as needed. Otherwise, the operator may merely rely on information stored in the call queue 504 about the E911 call. If the operator performs one or more actions for the E911 call without talking to the caller, the operator may prompt the system to send a text message to the wireless device 308 associated with the caller so that the caller is informed of any progress made in addressing their emergency—e.g., "The police have been dispatched to your location."

Figure 6:
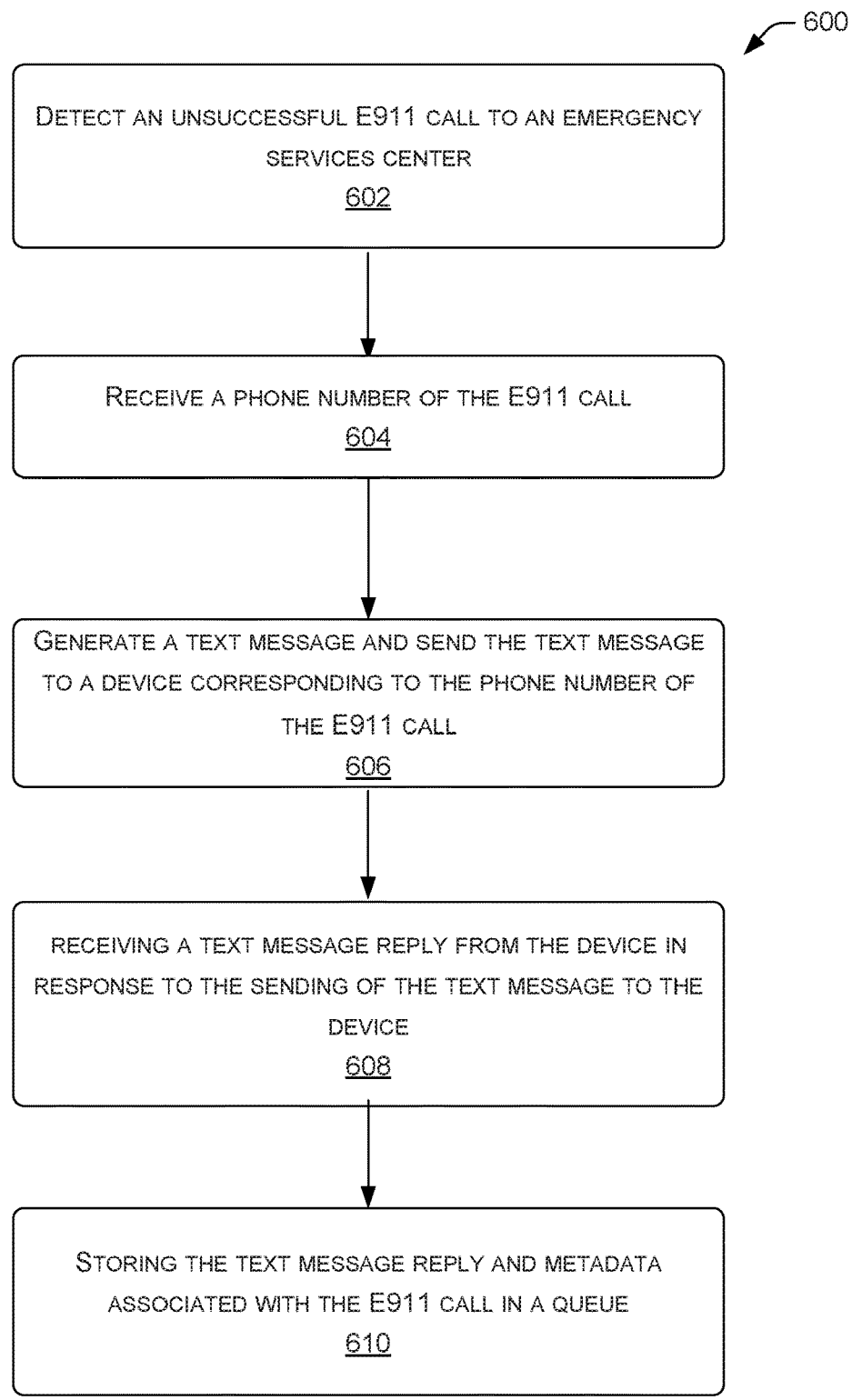
FIG. 6 is a flow diagram of a process of handling an E911 call, according to various embodiments.

FIG. 6 is a flow diagram of a process 600 in a system, such as network 100, to handle an E911 call, according to examples of the present disclosure. The process 600 can be performed by the server 312, illustrated in FIG. 3, or, in some examples, may be performed by a combination of the E911 services module 218 and the E911 text module 220, illustrated in FIG. 2. Though the following example description of process 600 describes server 312 as performing at least a portion of the process, other configurations are contemplated herein.

At 602, the server 312 may detect an unsuccessful E911 call to an emergency services center. An unsuccessful call may be a call that fails to reach a human operator within a predetermined time span, predetermined number of rings, or after a predetermined hold time. An E911 call may be dropped immediately upon placement of the call, for example, or sometime during the call due to a technical malfunction of the system. An E911 call may be placed on hold in a waiting queue while human operators are busy with other calls or other activities. The time span of such a hold may be long enough so that such a call may be considered to be a failed call. In some examples, the server 312 may detect such a failed call by monitoring the status of the call from the time it began through the time it is terminated, for example.

At 604, using conventional caller-ID techniques, the server 312 may receive the phone number of the E911 call. At 606, and as described above regarding FIG. 4, the server 312 may generate and send a text message to a device (e.g., wireless device 308) corresponding to the phone number of the E911 call. During such a time, the E911 call, which is a voice-based call, may be dropped (i.e., if still not connected or still on hold) by the system. In some examples, the anxiety of the caller may be reduced by the initiation of the text messaging at 606. If the call remains on-hold, for example, the text message may say, "please hold, your call will be answered shortly." In another example, the text message may say something like "please hang up, reply to this text message by briefly describing your emergency, and we will return your call shortly."

At 608, the server 312 may receive a text message reply from the wireless device 308. At 610, the server 312 may store the text message reply and metadata associated with the E911 call and/or the text message reply in the call queue 504, which may be stored in memory 202, for example. In some implementations, as mentioned above, the server 312 can apply a word recognition process to the text message reply to automatically determine (or partially determine) the nature of the emergency and/or other information that may be useful to the human operator at the time the human operator is able to manually respond to the E911 call. The word recognition process may result in an analysis of the text for keywords that are generally pertinent to an emergency, as described above. Such words may be stored in the E911 database 502 for retrieval by the operator.

In some examples, this information may also be useful to formulate an automatic response to the E911 call. The identification of the keyword "fire," for example, may prompt the system to automatically dispatch the relevant fire services. Similarly, the identification of the keywords "car accident" or "traffic accident" in the text message reply may prompt the automatic dispatch of police or roadside services.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A computer-implemented method comprising:
    detecting, by a server of a wireless communication network, an unsuccessful E911 call to an emergency services center;
    receiving, by the server, a phone number of the E911 call;
    in response to the detecting and the receiving, generating, by the server, a text message; and
    sending, by the server, the text message to a device corresponding to the phone number that originated the E911 call.

2. The computer-implemented method of claim 1, wherein detecting the unsuccessful E911 call comprises determining that the E911 call has rung a predetermined number of times without being answered.

3. The computer-implemented method of claim 1, wherein the E911 call is considered to be unsuccessful based, at least in part, on the E911 call remaining on hold for a predetermined amount of time without being answered by a human operator.

4. The computer-implemented method of claim 1, further comprising:
    receiving a text message reply from the device in response to sending the text message, the text message reply including data related to a nature of an emergency associated with the E911 call.

5. The computer-implemented method of claim 4, further comprising:
    storing the text message reply and metadata associated with the E911 call in a call queue of an E911 database.

6. The computer-implemented method of claim 5, further comprising:
    applying a word recognition process to the text message reply to determine data related to a nature of an emergency associated with the E911 call.

7. The computer-implemented method of claim 5, wherein the call queue is accessible to a human operator at the emergency services center.

8. The computer-implemented method of claim 1, further comprising:
    receiving location information for the device from the E911 call.

9. A server of a wireless communication network comprising:
    a non-transitory storage medium; and
    instructions stored in the non-transitory storage medium, the instructions being executable by the server to:
        detect an unsuccessful E911 call to an emergency services center;
        receive a phone number of the E911 call;
        generate a text message; and
        send the text message to a device corresponding to the phone number that originated the E911 call.

10. The server of claim 9, wherein the E911 call is considered to be unsuccessful based, at least in part, on a failure of the E911 call to reach a human operator of the emergency services center within a predetermined amount of time.

11. The server of claim 9, wherein the instructions are further executable by the server to:
    receive a text message reply from the device in response to the sending of the text message to the device, the text message reply including data related to a nature of an emergency associated with the E911 call.

12. The server of claim 11, wherein the instructions are further executable by the server to:
    store the text message reply and metadata associated with the E911 call in a call queue of an E911 database accessible to the emergency services center.

13. The server of claim 9, wherein the instructions are further executable by the server to:
    apply a word recognition process to the text message reply to determine data associated with the E911 call.

14. The server of claim 13, the word recognition process configured to identify a plurality of keywords.

15. A wireless communication network server comprising:
    one or more processors;
    a non-transitory storage medium; and
    instructions stored in the non-transitory storage medium, the instructions being executable by the one or more processors to:
        detect an unsuccessful E911 call to an emergency services center;
        receive a phone number of the E911 call;
        generate a text message; and
        send the text message to a device corresponding to the phone number that originated the E911 call;
        wherein the text message provides instructions to a caller associated with the E911 call to remain on hold, and send a text message reply providing data related to a nature of an emergency associated with the E911 call.

16. The wireless communication network server of claim 15, wherein the instructions are further executable by the one or more processors to:
   store the data associated with the text message reply and metadata associated with the E911 call in a call queue of an E911 database.

17. The wireless communication network server of claim 16, wherein the call queue is accessible to a human operator at the emergency services center.

18. The wireless communication network server of claim 15, wherein the instructions are further executable by the one or more processors to:
   receive location information from the device associated with the E911 call.

19. The wireless communication network server of claim 15, wherein the instructions are further executable by the one or more processors to:
   apply a word recognition process on the text message reply to determine data associated with a nature of an emergency of the E911 call; and
   store the data associated with the text message reply and metadata associated with the E911 call in a call queue based at least in part on one or more keywords identified during the word recognition process.

\* \* \* \* \*